United States Patent [19]

Fujii et al.

[11] 4,334,040
[45] Jun. 8, 1982

[54] PROPYLENE BLOCK COPOLYMERS

[75] Inventors: Masaki Fujii; Mitsutaka Miyabayashi, both of Yokkaichi, Japan

[73] Assignee: Mitsubishi Petrochemical Company Limited, Japan

[21] Appl. No.: 186,578

[22] Filed: Sep. 12, 1980

[30] Foreign Application Priority Data

Sep. 18, 1979 [JP] Japan ................................ 54-119943
Sep. 18, 1979 [JP] Japan ................................ 54-119944

[51] Int. Cl.³ .......................................... C08F 255/08
[52] U.S. Cl. .................................... 525/321; 525/323
[58] Field of Search ....................... 525/320, 321, 323

[56] References Cited

U.S. PATENT DOCUMENTS 3,480,696 11/1969 Hassell ................................. 525/321
3,509,056 4/1970 Shepherd ........................... 525/321
3,853,969 12/1974 Kontos ................................. 525/321
4,039,632 8/1977 Edmonds ............................. 525/321

FOREIGN PATENT DOCUMENTS 990717 4/1965 United Kingdom .
1059978 2/1967 United Kingdom .

Primary Examiner—Paul R. Michl
Attorney, Agent, or Firm—Robert E. Burns; Emmanuel J. Lobato; Bruce L. Adams

[57] ABSTRACT

A propylene block copolymer comprising propylene, ethylene and a straight-chain α-olefin of 5 to 12 carbon atoms is characterized in that: its limiting viscosity is 0.3 to 15 dl/g (at 135° C., in decalin); it comprises specified quantities of these monomers; and when it is subjected to successive extraction with o-dichlorobenzene at 40° C. and 80° C., the quantities, fusion peak temperatures, and content of the α-olefin of the resulting fractions are respectively within specific limits of values.

12 Claims, No Drawings

PROPYLENE BLOCK COPOLYMERS

BACKGROUND OF THE INVENTION

1. Field of the Art

This invention relates to flexible or soft thermoplastic block copolymers of propylene having excellent heat resistance and impact resistance. More particularly, the invention relates to thermoplastic block copolymers which are resin materials having physical qualities ranging from flexible or soft to semirigid and possessing in balanced combination both heat resistance and impact resistance of excellence not found in resin materials known heretofore.

In recent years, the development of thermoplastic materials of physical natures ranging from flexible to semirigid, which have heat resistance, particularly the retention of shape against outside force at high temperatures, and impact resistance, especially the strength to withstand impact at low temperatures, has been sought with ever-growing expectations in many fields for uses of these materials in products such as motor vehicle parts, parts of home electrical appliances, coatings of electric cables, tubes and pipes, and various containers.

Typical flexible materials are polyvinyl chlorides containing plasticizers, ethylene-vinyl acetate copolymers, and ethylene-α-olefin copolymers. While these materials have excellent impact resistance at low temperatures, they are deficient in resisting deformation when heated. In contrast, random copolymers of propylene and another olefin, in general, can become flexible materials having deformation resistant properties at high temperatures that are superior to those of the above mentioned copolymers and also have excellent impact resistance at room temperature but are weak in withstanding impact at low temperatures.

2. Prior Art

In the prior art, much effort has been directed toward the improvement of impact resistance of propylene-based polymer materials. Representative of such effort are those relating to, for example: random copolymers of propylene and ethylene (as disclosed in Japanese Patent Publication Nos. 22052/1967, 42988/1971, etc.); block copolymers of the propylene and ethylene (as disclosed in the specifications of Japanese Patent Publication Nos. 14834/1963, 21494/1963, 1836/1964, and 22688/1967, U.S. Pat. No. 3,624,184, and British Pat. Nos. 889,230, 957,777, and 1,134,660, etc.); random copolymers of propylene and butene-1 (as disclosed in the specifications of U.S. Pat. Nos. 1,918,457, 3,278,504, and 3,332,921 and Japanese Patent Laid-Open Publication Nos. 38787/1975, 79984/1978, etc.); random copolymers of propylene and hexene-1 (as disclosed in Japanese Patent Laid-Open Publication No. 53983/1974, etc.); and random copolymers of propylene and 4-methyl-1-pentene (as disclosed in Japanese Patent Laid-Open Publication No. 104686/1978).

These contributions to the prior art have certainly succeeded in varying degrees on the point of obtaining propylene-based polymers of improved impact resistance. However, these polymers are rigid or semirigid, or those which are flexible are not amply improved in impact resistance at low temperatures or have poor heat resistance. Thus, none of these polymers fully satisfies all of the requisites of the polymers which this invention seeks to provide.

We have previously proposed, as a propylene-based flexible thermoplastic resin material having excellent heat resistance and transparency, a block copolymer comprising propylene and a straight-chain α-olefin having 5 to 12 carbon atoms (as disclosed in Japanese Pat. Appln. No. 68532/1979, and U.S. patent application Ser. No. 152,605) now U.S. Pat. No. 4,308,361. This block copolymer is considered to have a considerably improved impact resistance but cannot fully meet the requirement for impact resistance of a high degree.

SUMMARY OF THE INVENTION

It is an object of this invention to provide thermoplastic block copolymers having physical qualities ranging from flexible or soft to semirigid and possessing in balanced combination both high heat resistance and high impact resistance.

This and other objects of this invention have been achieved on the basis of our discovery that a block copolymer comprising (a) a random copolymer block of propylene and a straight-chain α-olefin having 5 to 12 carbon atoms and (b) an ethylene homopolymer block or a binary or ternary random copolymer block of ethylene (and propylene) and a straight-chain α-olefin having 5 to 12 carbon atoms is, when prepared by suitably selecting the copolymerization conditions, a material of a physical quality in the range of flexible to semirigid having, in excellently balanced combination, heat resistance and impact resistance, particularly impact resistance at low temperatures.

We have found that these block copolymers have impact resistances such that they can fully withstand use thereof at temperatures as low as $-20°$ C. and even $-40°$ C., not to mention temperatures above room temperature, and have high heat resistance by which they can retain their shapes at more than 120° C., particularly more than 140° C.

According to this invention, briefly summarized in view of monomeric species, there are provided propylene block copolymers each of which is characteristically defined by the following conditions.

(1) That the limiting viscosity of the copolymer in decalin at 135° C. be 0.3 to 15 dl/g.

(2) That the copolymer comprise (a) 50 to 99 parts by weight of a random copolymer block of propylene and a straight-chain α-olefin having 5 to 12 carbon atoms and (b) 1 to 50 parts by weight of an ethylene polymer block selected from the group consisting of ethylene homopolymer blocks, binary random copolymer blocks of ethylene and straight-chain α-olefins each having 5 to 12 carbon atoms, and ternary random copolymer blocks of ethylene, propylene, and a straight-chain α-olefin having 5 to 12 carbon atoms.

The nature, utility, and further features of this invention will be more clearly apparent from the following detailed description commencing with a consideration of the general and basic aspects of the invention and concluding with specific examples thereof and comparison examples.

DETAILED DESCRIPTION OF THE INVENTION

1. Block copolymer—intrinsic properties thereof 1-1. Composition

A propylene block copolymer according to this invention comprises (a) a random copolymer block of propylene and a straight-chain α-olefin having 5 to 12 carbon atoms (monomer A) and (b) a homopolymer block of ethylene (monomer B) or a binary or ternary random copolymer block of ethylene (and propylene) and a straight-chain α-olefin having 5 to 12 carbon atoms.

While a block copolymer according to this invention is not necessarily limited to one comprising only the blocks of (a) and (b) defined above, when another block is coexisting, the total quantity of blocks (a) and (b) should be more than 50 percent by weight, particularly more than 80 percent by weight.

The block (a) is that component which is produced by polymerization carried out under the condition that propylene and the monomer A are present at the same time in the reaction system. The block (b) is that component which is produced by polymerization of ethylene carried out under the condition that the monomer A is not present in the reaction system or is that block produced by polymerization carried out under the condition that the monomer B and the monomer A (and additionally, propylene, depending on the case) are present at the same time in the reaction system.

Either of the blocks (a) and (b) may be formed first, but the block formed later is formed in the presence of the block formed first. Ordinarily, the block (a) is formed first. It is possible for another polymer component to be formed and be present prior to, after, or between the formations of the blocks (a) and (b). For example, the case wherein, prior to the formation of the blocks (a) and (b), a homopolymer component of propylene is formed and is present has particularly high practicality.

In the case where the copolymer is formed in the order of (a) and (b), and, moreover, the block (b) comprises a homopolymer of ethylene, there are instances wherein a small quantity of the monomer A and/or propylene used in the formation of the block (a) remains in the initial period of the formation of the block (b), but this is permissible. Furthermore, in the case where the copolymer is formed in the order of (b) and (a), there are instances wherein a small quantity of the monomer B used in the formation of the block (b) remains in the initial period of the formation of the block (a) and becomes incorporated within the block (a), but this is permissible. That is, the important point is that the blocks (a) and (b) be essentially a copolymer of propylene and the monomer A and a homopolymer of ethylene or a copolymer of ethylene (and propylene) and the monomer A, respectively.

The possible form which a block copolymer of this character may take is that wherein a homopolymer block and a random copolymer block or a random copolymer block of a certain composition and a random copolymer block of a different composition are coexisting in a single polymer molecular chain, that of a physical mixture of the molecular chains of these two blocks, or that of a mixture of these forms.

Throughout this specification, all quantities expressed in parts and percent are by weight unless specified otherwise.

A block copolymer of this invention comprises (a) 50 to 99 parts, preferably 60 to 98 parts, most preferably 70 to 95 parts of a random copolymer block of propylene and the monomer A and (b) 1 to 50 parts, preferably 2 to 40 parts, most preferably 5 to 30 parts of a homopolymer block of the monomer B or of a binary or ternary random copolymer block. We have found that, when the quantity of the random copolymer block (a) exceeds the upper limit of the above range, the effect of improvement of the impact resistance of the block copolymer is not fully exhibited.

The content of the monomer A in the random copolymer component (a) is of the order of 1 to 20 percent, preferably 3 to 18 percent, most preferably 5 to 15 percent. We have found that, by varying the content of this monomer A within this range, the stiffness of the block copolymer can be controlled over a wide range. Particularly when the content of the monomer A exceeds 10 percent, the block copolymer becomes extremely flexible. When this content is less than 10 percent, the block copolymer becomes semirigid. Furthermore, when this content is outside of the upper limit and the lower limit of the above stated range, the heat resistance and the impact resistance, respectively, of the block copolymer are lowered.

The copolymer block (b) is a homopolymer of the monomer B or a binary or ternary copolymer of the monomer B (and propylene) and the monomer A, and the content of the above named three monomers in this copolymer component is selected from the range of 1 to 99 percent (wherein the propylene content is 0 to 99 percent). Preferred ranges of quantities with respect to the copolymer component are 10 to 97 percent (particularly 50 to 95 percent) of the monomer B, 0 to 88.5 percent (particularly 0 to 45 percent) of propylene, and 1.5 to 50 percent (particularly 2 to 30 percent) of the monomer A.

1-2. Monomer A (straight-chain α-olefin having 5 to 12 carbon atoms)

Monomers falling within this category are pentene-1, hexene-1, heptene-1, octene-1, nonene-1, decene-1, undecene-1, and dodecene-1. Of these, pentene-1, hexene-1, and octene-1 are preferred because of their high reactivity with propylene. Hexene-1 is particularly preferred.

1-3. Molecular weight

It is necessary that the molecular weight of the block copolymer fall within a range corresponding to a limiting viscosity of 0.3 to 15 dl/g in decalin at 135° C. We have found that when the molecular weight is below this range, the mechanical characteristics of the copolymer fail to reach practical levels, or the fabrication itself of the copolymer becomes impossible. When the molecular weight is higher than this range, the viscoelastic characteristic of the copolymer in the molten state deteriorates, whereby, in this case also, the copolymer cannot be formed.

2. Block copolymer—heat resistance and impact resistance thereof

The heat resistance of a block copolymer according to this invention is unique in its balance with the flexibility of the copolymer. More specifically, we have found that when the deformations under application of heat and pressure, as described hereinafter, of low-density polyethylenes, ethylene-vinyl acetate copolymers, polyvinyl chlorides containing plasticizers, and the like having flexibilities similar to those of the block copolymers of this invention are examined, it is apparent that these known polymers are deformed by pressure at temperatures of the order of approximately 100° C. and, at the most, 120° C., whereas, in contrast, there is almost no deformation even at temperatures above 140° C. in the block copolymer of this invention. This unique characteristic of the block copolymer of this invention is undoubtedly related to the fact that its melting peak temperature as measured by a differential scanning calorimeter (DSC) is 140° C. or higher.

Furthermore, when the morphological structure of a pressed sheet formed from a block copolymer of this invention is examined by means of an electron microscope, a structure resembling a sea and islands is observed. The island parts are composed principally by a homopolymer of the monomer B or a binary or ternary random copolymer of the monomer B (and propylene) and the monomer A, and it is apparent that these parts are serving to improve the impact resistance, particularly the impact resistance at low temperatures, of the block copolymer.

However, while known block copolymers of propylene and ethylene also have similar morphological structures, the copolymers of this invention have far superior impact resistance. The reason for this difference can be readily conceived to lie, not merely in the presence or absence of the sea-and-islands structure, but also to a great extent in the chemical structure of the copolymer constituting both the sea and island parts. However, the true reasons for this unprecedented improvement in impact resistance are not yet fully apparent.

3. Block copolymer—more generalized definition

In place of the definition of the copolymer given hereinabove in view mainly of the composition of the monomeric species, the copolymers in accordance with the present invention can also be defined by a more generalized definition.

According to the more generalized definition, the present block copolymer is characterized by the following features (1)–(3).

(1) the limiting viscosity in decalin at 135° C. is 0.3 to 15 dl/g;

(2) the copolymer comprises 2 to 40% by weight of a straight-chain α-olefin having 5 to 12 carbon atoms, monomer A, and 1 to 50% by weight of ethylene, monomer B; and (3) the quantity, the fusion peak temperature as determined by differential scanning calorimetry (DSC), the contents of the straight-chain α-olefin and the ethylene of each of the fractions resulting from successive extraction of the copolymer at 40° C. and 80° C. by means of o-dichlorobenzene are as indicated in the table.

| Fraction | Quantity (% by weight) | Fusion peak temp. by DSC(°C.) | Content of straight-change α-olefin (% by weight) | Content of ethylene (% by weight) |
|---|---|---|---|---|
| Fraction soluble at 40° C. or lower | 5 to 40 | Substantially no peaks recognizable | 5 to 80 | 4 to 50 |
| Fraction soluble above 40° C. up to 80° C. | 15 to 45 | 80 to 150 | 3 to 60 | 3 to 45 |
| Fraction insoluble at 80° C. or lower | 15 to 80 | at the higher temp. 135 to 165, at the lower temp. 105 to 135 | 0.1 to 11 | 1 to 35 |

The detail of the conditions (1) through (3) is as follows.

3-1. Molecular weight

See the description given in the paragraph 1-3.

3-2. Composition

Monomer A comprises 2 to 40, preferably 3 to 30, more preferably 4 to 20, % by weight, and Monomer B comprises 1 to 50, preferably 2 to 40, more preferably 3 to 30, % by weight, of the final block copolymer. The lower content of Monomer A than the lower limit of the above range will result in the loss of flexibility or softness and the higher content of Monomer A than the upper limit of the range will result in loss of heat resistance or generation of tackiness of the copolymer. The lower content of Monomer B than the lower limit of the range will result in loss of impact resistance at a lower temperature and the higher content of Monomer B than the upper limit of the range will result in decrease in heat resistance.

3-3. Successive extraction

For the present copolymer to exhibit its expected characteristics in a high degree, it is necessary that the aforedescribed conditions for the whole polymer, that is, for the entire polymer, be satisfied, and that, in addition, the fractions obtained from successive extraction at 40° C. and 80° C. by using o-dichlorobenzene satisfy the following conditions.

3-3-1. Quantities of fractions (1) The quantity of the fraction soluble at 40° C. or lower temperature (hereinafter referred to as fraction A) is 5 to 40 percent, preferably 10 to 35 percent, more preferably 15 to 30 percent.

(2) The quantity of the fraction soluble at a temperature exceeding 40° C. but being 80° C. or lower (hereinafter referred to as fraction B) is 15 to 45 percent, preferably 20 to 40 percent, more preferably 25 to 35 percent.

(3) The quantity of the fraction insoluble at 80° C. or lower (hereinafter referred to as fraction C) is 15 to 80 percent, preferably 25 to 70 percent, more preferably 35 to 60 percent.

The fraction A is an element governing principally the flexibility or softness of the present copolymer and, if its quantity is below the above specified range, the flexibility or softness will be reduced. If the quantity of the fraction A is above the above specified range, it will give rise to an impairment of its heat resistance.

The fraction B is an element governing principally the impact resistance of the copolymer at a lower temperature, and, if its quantity is below the above specified range, the properties of the copolymer at a lower temperature will be impaired. When the quantity of the fraction A is above the above specified range no problems will be raised in view of the properties of the copolymer at a lower temperature but the higher quantity is not preferable because the quantities of the fractions A and C are unduly reduced thereby impairing the properties of the copolymer.

The fraction C is an element governing principally the heat resistance of the present copolymer. If its quantity is less than the above specified range, the heat resistance of the copolymer will be impaired. If its quantity exceeds the specified range, the softness of the copolymer will be adversely affected.

3-3-2. Fusion characteristic by DSC

In the case where a fusion thermograph is determined by DSC in conformance with the conditions set forth hereinafter, it is necessary that a fusion peak be not observable for the fraction A, that is to say, that this fraction A be substantially noncrystalline. In a rare case, a very minute peak is observed, but an occurrence of this order should be interpreted as one wherein a peak is substantially not recognizable.

The fraction B should have one or more distinct fusion peak in the temperature range of 80° to 150° C., preferably 85° to 145° C., more preferably 90° to 140° C. When two peaks are found, it is assumed that the peak at the lower temperature is based on the Monomer B chains and the peak at the higher temperature is based on the propylene chains. When only one peak is found, it is understood that the single peak which may be somewhat brood is a superimposure of the above two peaks. When these fusion peak temperatures are below the specified temperature range, the copolymer may be tacky, and when these fusion peak temperatures are above the specified temperature range, the flexibility or softness of the copolymer may be impaired.

The fraction C usually has two peaks. The peak at the higher temperature should be in the temperature range of 135° to 165° C., preferably 137° to 163° C., more preferably 140° to 160° C., and the peak at the lower temperature should be in the range of 105° to 135° C., preferably 110° to 133° C., more preferably 115° to 130° C. As is the case of the fraction B, the peak at the higher temperature and the peak at the lower temperature are assumed to be based on the propylene chains and the ethylene chains, respectively, but it is possible that the peak at the lower temperature is too small to be observed. The disadvantages expected when the peak temperatures are off the specified ranges are the same as those given hereinbefore in terms of the fraction B.

3-3-3. Composition

It is necessary that the monomer A content in percent by weight in each of the extracted fractions of the copolymer be as follows.

The monomer A content in the fraction A is 5 to 80 percent, preferably 7 to 70 percent, more preferably 10 to 60 percent. In the case where this monomer A content departs from this range, the quantity of the fraction A deviates from the range set forth in the above paragraph 3-1-1, whereby the undesirable result described there is incurred.

The monomer A content in the fraction B is 3 to 60 percent, preferably 5 to 50 percent, more preferably 7 to 40 percent.

The monomer A content in the fraction C is 0.1 to 11 percent, preferably 0.5 to 9 percent, more preferably 1 to 7 percent.

The ranges of these monomer A contents in the fractions B and C are also established for the same reasons as those for the fraction A.

It is necessary that the monomer B content in percent by weight in each of the extracted fractions of the copolymer be as follows.

The monomer B content in the fraction A is 4 to 50 percent, preferably 6 to 40 percent, more preferably 8 to 30 percent; in the fraction B 3 to 45 percent, preferably 4 to 40 percent, more preferably 5 to 35 percent; and in the fraction C 1 to 35 percent, preferably 1.5 to 30 percent, more preferably 2 to 25 percent. In the case where the monomer B contents depart from the ranges, the quantities of the fractions A to C deviate from the ranges set forth in the above paragraph 3-3-1, whereby the undesirable results described there are incurred as is the case of the monomer A.

4. Production of the block copolymer

A block copolymer of this invention can be produced by a combination of a process step (a) of forming 50 to 99 parts, preferably 60 to 98 parts, more preferably 70 to 95 parts of a random copolymer of propylene and a monomer A and a process step (b) of forming 1 to 50 parts, preferably 2 to 40 parts, most preferably 5 to 30 parts of a homopolymer of a monomer B or a binary or ternary random copolymer of a monomer B (and propylene) and a monomer A, carried out in the presence of stereoregular polymerization catalyst.

Either of these process steps (a) and (b) may be carried out first. Prior to, in between, or after these process steps (a) and (b), another polymerization step, such as, for example, a propylene homopolymerization step, may be carried out. During the transition from the step (a) to the step (b) or from the step (b) to the step (a), a small quantity of the monomer(s) used in the preceding step may remain within the system in the initial period of the succeeding step in some instances, but this is permissible. These and other features and the polymerization proportions of the monomers in the steps (a) and (b), as well as other particulars, are as described hereinbefore with respect to the composition of the block copolymer.

A suitable stereoregular polymerization catalyst is, for example, one wherein the principal ingredients are a titanium component and an organoaluminum compound. For the titanium component, titanium trichloride of $\alpha$, $\beta$, $\gamma$, or $\delta$ form, a titanium compound supported on a carrier such as magnesium chloride, etc., or the like is used. Particularly when a titanium trichloride prepared from a titanium trichloride containing aluminum chloride obtained by reducing titanium tetrachloride with an organoaluminum compound (which titanium trichloride may be considered to be a eutectic complex of titanium trichloride and aluminum chloride) by extracting and removing therefrom the aluminum chloride, by using a complexing agent, is used, the reactivity of the monomer A in the random copolymerization of propylene and the monomer A is higher than that in the case where another titanium component is used. Furthermore, the bulk density of the polymer powder thus formed is high, and, moreover, in the case where polymerization is carried out in an inactive hydrocarbon medium, the quantity of the product soluble in this medium can be held to a remarkably low level.

When a high yield of the copolymer relative to the catalyst is desired, the use of titanium trichloride or titanium tetrachloride supported on magnesium chloride is also possible.

For the organoaluminum compound component, a compound expressed by the formula $AlR_aY_{3-a}$ is advantageously used. In this formula, a is any number defined by $0 < a \leq 3$; Y is a halogen atom; R is a hydrocarbon residue having 1 to 18 carbon atoms and is preferably an alkyl group or an aryl group. Specifically, triethylaluminum, diethylaluminum chloride, and the like are preferred.

The catalyst comprising a combination of these two essential components may contain in combination a small quantity of an electron donor as a third component. Particularly in the case where a titanium component supported on a carrier such as magnesium chloride is used, the addition of a small quantity of an electron donor is even preferred. As an electron donor, an organic acid ester, an ether, an amine, an alcohol, a ketone, an aldehyde, a phenol, or the like is used. Details of such electron donors are set forth in the specification of Japanese Patent Application 67446/1978.

For the polymerization, either a continuous method or a batch method is possible. In the case where it is to be carried out by a continuous process, one or more polymerization vessels are used for each of the aforedescribed process steps (a) and (b), and in each vessel, the reaction is carried out under steady-state conditions. In a batch process, after completion of reaction of the total quantity or a predetermined quantity of the monomers of prescribed quantity, the process is moved on to the succeeding step, but at a point where the prescribed quantity of the monomers has reacted, a portion or all of the unreacted monomers is once taken out of the vessel, and then the succeeding step is carried out.

In one example of a typical method of practice, homopolymerization of propylene is first carried out, and then random copolymerization of propylene and a monomer A (step (a)) is carried out. Then the greater part of only the propylene is purged out of the reaction vessel, and finally homopolymerization of ethylene (step (b)) is carried out or, after the above mentioned step (a), random copolymerization of ethylene (and propylene) and the monomer A (step (b)) is carried out.

The process of this invention is ordinarily carried out at a polymerization temperature in the range of 0° to 200° C. and a polymerization pressure in the range of 0 to 100 kg/cm² gage. Some decrease of the polymerization pressure to a negative pressure (gage) is permissible. Furthermore, differences between the temperatures and pressures in the process steps are permissible. Hydrogen can be used for control of the molecular weight of the copolymer. Furthermore, varying the hydrogen concentration between the process steps thereby to give rise to a difference in the molecular weights of the copolymers formed therein is permissible.

Ordinarily, in most cases, the polymerization is carried out by suspension polymerization method or a solution polymerization method in an inactive hydrocarbon such as n-heptane, n-hexane, or toluene, but it is also possible to carry out the polymerization by appropriately combining a solventless, liquid-phase polymerization method in liquid propylene and a polymerization method in a gas such as propylene or ethylene.

5. Examples of experiments

In order to indicate more fully the nature and utility of this invention, the following examples and comparison examples are set forth, it being understood that these examples are presented as illustrative only and that they are not intended to limit the scope of the invention.

Unless otherwise specified, measurements were made of Olsen bending stiffness (10° angle) in accordance with ASTM D-747-70, of Charpy impact strength in accordance with Japanese Industrial Standards JIS K 7111, and of MFR (melt flow rate) in accordance with JIS K 6758. Rate of deformation under heat and pressure was determined on the basis of the following method.

Determination of deformation under heat and pressure

Each copolymer whose heat resistance is to be evaluated is made into a sheet of 2-mm thickness by a process such as pressing or injection molding. From this sheet, test specimens of 10-mm length, 10-mm width, and 2-mm thickness are cut out. These test specimens are subjected to pressure by placing them between pressure-applying plates in a silicon-oil bath maintained at a specific temperature (150° C.) and placing a load of a specific quantity (3 kg) on the plates. The quantity of deformation with elapse of time of each test specimen is measured by means of a dial gage, and the rate (percent) of deformation under heat and pressure is calculated by the following equation.

$$\text{Rate of deformation under heat and pressure} = \frac{\text{Quantity of deformation of test specimen}}{\text{Thickness of test specimen (2 mm)}} \times 100$$

DSC analysis

By using a Perkin-Elmer Model DSC-2 differential scanning calorimeter, 5 mg of each copolymer sample is heated and fused for 3 minutes in a stream of nitrogen at 190° C. and thereafter cooled to 60° C. at a cooling rate of 10° C./minute thereby to crystallize the same. Then, as the sample is again fused by raising its temperature at a rate of 10° C./minute, a thermogram is obtained. From this, the temperate(s) corresponding to the peak(s) (one or more) is(are) read.

Successive extraction

For this successive extraction, an extraction apparatus comprising, essentially, a hollow glass cylinder of 88-mm inner diameter and height of 700 mm, clean glass beads of 80- to 100-mesh size of an apparent volume corresponding to 2,000 ml placed in the glass cylinder, and an outer hollow cylinder for flow therein of silicon oil for temperature adjustment, and having, at its upper part, a probe tube with a temperature-detecting end, a polymer solution feed nozzle, and an extraction solvent feed nozzle and, at its lower part, a drain nozzle is used.

o-Dichlorobenzene (hereinafter referred to as ODCB) in a quantity to bring its level just even with the upper level of the layer of the glass beads is introduced beforehand into the glass cylinder, and the temperature therein is maintained at 140°±0.5° C. Separately, approximately 3.0 g of precisely weighed copolymer and 1 g of 2,6-di-t-butyl-p-cresol (as an antioxidant) are dissolved beforehand in 500 g of ODCB at 140° C., and this solution is gently added onto the previously added ODCB layer.

The drain nozzle is opened to drain out the previously added ODCB at a rate of 500 ml/hour, and, at the same time, to cause the glass bead layer to be immersed in the copolymer solution added later. Then the entire apparatus is left to cool naturally to room temperature, whereupon the polymer is deposited on the surfaces of the glass beads.

By adjusting the temperature of the silicon oil flowing within the outer cylinder, the temperature within the glass cylinder, constituting an extraction column, is set at 39.5° to 40.0° C. The drain nozzle is opened to drain out the polymer solution at a rate of 1 liter/hour. At the same time, through the top of the tower, ODCB containing 0.2 percent of 2,6-di-t-butyl-p-cresol and adjusted to a temperature of 39.5° to 40.0° C. is added at the same rate of draining of the polymer solution. By this procedure, the fraction of the polymer soluble in the ODCB at 40° C. is extracted. The end point of this extraction is verified as that point at which the index of refraction of the extracted liquor becomes equal to that of the solvent after a volume of the extracted liquor equal to three or more times the holding volume of the column has been drained.

The temperature within the column is then set at 79.5° to 80.0° C., and, by the same procedure as that carried out at 40° C., the polymer fraction soluble in ODCB at 80° C. is extracted.

With respect to fraction which is insoluble in ODCB at 80° C., the above described procedure is carried out with a column interior temperature of 140° C., and the total quantity is extracted.

Of the extracted liquors respectively obtained at different temperatures, only the fraction of 40° C. is concentrated to dryness. Each of the other fractions is preparatorily concentrated at 70° to 80° C. under reduced pressure in a rotary evaporator, and an excess quantity of acetone is added to the concentrated solution thus obtained thereby to precipitate the polymer. The precipitated polymer is separated through a No. G-3 glass filter, and is washed with an excess quantity of acetone to remove the antioxidant remaining in the polymer. Finally, the polymer is dried in a vacuum at 80° C. for 8 hours, and then the specified analysis is carried out.

EXAMPLE A1

Into a 3-liter stainless-steel polymerization vessel provided with agitation vanes was introduced 1 liter (lit.) of n-heptane. Then, after ample purging of the vessel interior with nitrogen, 0.75 gram (g) of diethylaluminum chloride (DEAC) and 0.15 g of a titanium trichloride (TAU catalyst manufactured by Marubeni Solvay Kagaku) were placed in the vessel. The vessel interior temperature was set at 50° C., and, in the first stage of the polymerization, ethylene was fed at a rate of 40 g/hour over a period of 2 hours. After the supply of ethylene was stopped, the polymerization was continued until the interior pressure of the polymerizer became 0.4 kg/cm² gage (the above described process being the step of homopolymerization of ethylene).

Then, in the second stage of the polymerization, the temperature within the vessel was raised to 60° C., and propylene, hexene-1, and hydrogen were supplied thereinto respectively at rates of 100 g/hour, 165 g/hour, and 500 cc (STP)/hour over a period of 2.5 hours. At the end of this period, the supplying of the hexene-1 and hydrogen was stopped, and the supply of only the propylene was continued at a rate of 100 g/hour for 0.5 hour. After the supplying of the propylene was stopped, copolymerization was continued for a further 1.5 hours with only the propylene and hexene-1 remaining in the reaction system (the above described process being a propylene/hexene-1 random copolymerization step).

Then after the copolymerization over two stages as described above, the catalyst was decomposed with butanol, and particles of the polymer formed were separated by filtration, repeatedly washed with n-heptane, and thereafter dried under reduced pressure and at 90° C. for 24 hours.

The proportions, compositions, and physical properties respectively of the polymer components of the copolymer thus obtained are set forth in Table A1. However, it was difficult to calculate the proportions and compositions of these polymer components from only the instant experiment, and for this reason the process was carried out separately under the same conditions as the above described example up to an intermediate polymerization stage. Then, immediately thereafter, the catalyst was decomposed, and the weight and composition of the polymer obtained by washing, separation by filtration, and drying under the same conditions as in Example A1 were measured. Under the assumption that these measured values were applicable also to each polymerization stage of the example, calculations of the above mentioned proportions and compositions were carried out indirectly. Furthermore, the compositions were measured by carbon 13 NMR.

EXAMPLE A2

Propylene block copolymerization was carried out under the conditions specified in Example A1 except for a feed rate of the hexene-1 of 70 g/hour in the propylene/hexene-1 random copolymerization step.

The results are shown in Table A1.

EXAMPLE A3

Propylene block copolymerization was carried out under the conditions set forth in Example A1 except that the propylene, hexene-1, and hydrogen in the propylene/hexene-1 random copolymerization step were fed at rates of 90 g/hour, 150 g/hour, and 800 cc (STP)/hour, respectively, over 2 hours, at the end of which the feeding of the hexene-1 and hydrogen was stopped, and only the feeding of the propylene was continued at the rate of 90 g/hour for one hour.

The results are shown in Table A1.

EXAMPLE A4

Propylene block copolymerization was carried out under the conditions of Example A1 except for a feed rate of the ethylene of 70 g/hour in the ethylene homopolymerization step and a feed rate of the hydrogen of 1,000 cc (STP)/hour in the propylene/hexene-1 random copolymerization step.

The results are set forth in Table A1.

COMPARISON EXAMPLE A1

Copolymerization of propylene was carried out under the conditions of Example A1 except that the propylene/hexene-1 random copolymerizaton step was carried out directly without an ethylene homopolymerization step, and the feed rates of the hexene-1 and hydrogen during this random copolymerization were 155 g/hour and 120 cc (STP)/hour, respectively.

The results are set forth in Table A1.

COMPARISON EXAMPLE A2

Copolymerization of propylene was carried out under the conditions of Example A2 except that the ethylene homopolymerization step was not carried out, and the propylene/hexene-1 random copolymerization was carried out directly, during which the hexene-1 and hydrogen were fed at rates of 65 g/hour and 120 cc (STP)/hour, respectively.

The results obtained are shown in Table A1.

COMPARISON EXAMPLE A3

Propylene block copolymerization was carried out under the conditions of Example A3 except that the ethylene homopolymerization step was omitted, and the propylene/hexene-1 random copolymerization was carried out directly, during which the feed rates of the hexene-1 and hydrogen were 85 g/hour and 120 cc (STP)/hour, respectively.

The results are shown in Table A1.

EXAMPLE A5

Block copolymerization of propylene was carried out under the conditions of Example A3 except for the feeding at a rate of 200 g/hour of octene-1 instead of hexene-1.

The results are shown in Table A1.

EXAMPLE A6

Block copolymerization of propylene was carried out under the conditions of Example A1 except for the use of decene-1 instead of hexene-1.

The results are shown in Table A1.

the gage pressure was maintained at 2.0 kg/cm$^2$, propylene was fed for 15 minutes (this being homopolymerization of propylene).

The vessel interior temperature was then raised to 60° C., and propylene, hexene-1, and hydrogen were fed into the vessel at rates of 100 g/hour, 70 g/hour, and 500 cc (STP)/hour, respectively, for 2.5 hours. After this period, the feeding of the hexene-1 and hydrogen was stopped, and feeding of only the propylene was continued at the rate of 100 g/hour for a further 0.5 hour. After the feeding of the propylene was stopped, the copolymerization was continued for a further 1.5 hours with only the propylene and hexene-1 remaining in the reaction system (the above described process being the propylene/hexene-1 random copolymerization step).

Then the gases within the vessel were discharged until the gage pressure therewithin became 0.4 kg/cm$^2$, and then ethylene was fed thereinto at a rate of 40 g/hour for 1.5 hours. After the feeding of the ethylene was stopped, the copolymerization was continued for a further 0.5 hour with only the ethylene and hexene-1 remaining in the system (the above described process being the ethylene/hexene-1 random copolymerization step).

Upon completion of this serial copolymerization over three stages, the catalyst was decomposed with butanol, and the particles of the polymer thus formed were separated by filtration and repeatedly washed with n-hep-

TABLE A1

| | Ex. A1 | Ex. A2 | Ex. A3 | Ex. A4 | Comp. Ex. A1 | Comp. Ex. A2 | Comp. Ex. A3 | Ex. A5 | Ex. A6 |
|---|---|---|---|---|---|---|---|---|---|
| Propylene/monomer A random copolymerization step | | | | | | | | | |
| monomer A | hexene-1 | hexene-1 | hexene-1 | hexene-1 | hexene-1 | hexene-1 | hexene-1 | octene-1 | decene-1 |
| monomer A content (% by wt.) | 12.0 | 7.5 | 16.1 | 11.4 | 11.7 | 7.7 | 16.4 | 10.2 | 7.2 |
| polymerization proportion (parts by wt.) | 76.0 | 75.7 | 69.8 | 64.0 | 100 | 100 | 100 | 64.3 | 62.8 |
| Monomer B/monomer A random copolymerization step | | | | | | | | | |
| monomer B | ethylene | ethylene | ethylene | ethylene | | | | ethylene | ethylene |
| monomer B content (% by wt.) | 100 | 100 | 100 | 100 | | | | 100 | 100 |
| polymerization proportion (parts by wt.) | 24.0 | 24.3 | 30.2 | 36.0 | | | | 35.7 | 37.2 |
| Polymer properties | | | | | | | | | |
| limiting viscosity (dl/g (135° C., in decalin)) | 4.6 | 4.8 | 3.8 | 3.2 | 4.2 | 4.0 | 4.5 | 3.5 | 4.2 |
| Charpy impact strength (kg . cm/cm$^2$) at +23° C. | NB* | NB | NB | NB | 25.3 | 12.4 | NB | NB | NB |
| at −20° C. | 10.5 | 10.3 | 20.1 | NB | 3.1 | 3.1 | 3.4 | 25.3 | 11.3 |
| at −40° C. | 7.3 | 6.5 | 12.5 | 18.4 | 2.3 | 2.1 | 2.9 | 15.0 | 7.5 |
| at −60° C. | 4.2 | 3.8 | 5.4 | 9.6 | 2.2 | 2.2 | 2.4 | 6.2 | 3.9 |
| Olsen bending stiffness (10° angle) (kg/cm$^2$) | 5170 | 7200 | 4300 | 7890 | 2930 | 4480 | 1700 | 4050 | 6800 |
| deformation under heat and pressure (130° C., 3 kg/cm$^2$, 60 min.) (%) | 4.8 | 3.1 | 10.8 | 9.4 | 26.1 | 19.3 | 37.3 | 8.2 | 3.9 |
| monomer A content in the final copolymer (% by wt.) | 9.1 | 5.7 | 11.2 | 7.3 | 11.7 | 7.7 | 16.4 | 6.6 | 5.4 |
| monomer B content in the final copolymer (% by wt.) | 24.0 | 24.3 | 30.2 | 36.0 | 0 | 0 | 0 | 35.7 | 37.2 |

*NB signifies that the test piece did not break, the impact strength being 30 kg . cm/cm$^2$.

EXAMPLE B1

Into a 3-liter stainless-steel polymerization vessel provided with agitator vanes was introduced 1 liter of n-heptane. Then, after ample purging of the vessel interior with nitrogen, 0.75 g of DEAC and 0.15 g of a titanium trichloride (TAU catalyst manufactured by Marubeni Solvay Kagaku) were placed in the vessel. The vessel interior temperature was set at 50° C., and, as tane. These particles were thereafter dried at 90° C. under reduced pressure for 24 hours.

The proportions, compositions, and physical properties of the polymer blocks of the copolymer thus obtained are set forth in Table B1. However, it was difficult to calculate the proportions and compositions of these polymer blocks from only the instant experiment, and therefore the process was carried out separately under the same conditions as the above described example up to an intermediate polymerization stage. Then, immediately thereafter, the catalyst was decomposed, and the weight and composition of the polymer obtained by washing, separation by filtration, and drying under the same conditions as in the above described example were measured. Under the assumption that these measured values were applicable also to each polymerization step of the example, calculations of the above mentioned proportions and compositions were carried out indirectly. Furthermore, the compositions were measured by carbon 13 NMR.

COMPARISON EXAMPLE B1

Propylene block copolymerization was carried out under the conditions of Example B1 except that the process was carried out only up to and including the propylene/hexene-1 random copolymerization step, at which time the hydrogen was fed at a rate of 150 cc (STP)/hour, and the ethylene/hexene-1 random copolymerization step thereafter was omitted.

The results are shown in Table B1.

EXAMPLE B2

Under the conditions of Example B1 except for a hexene-1 feed rate of 100 g/hour, a propylene block copolymer comprising a propylene homopolymer block, a propylene/hexene-1 random copolymer block, and an ethylene/hexene-1 random copolymer block was produced.

The results are shown in Table B1.

COMPARISON EXAMPLE B2

Propylene block copolymerization was carried out under the conditions of Example B2 except that the process was carried out only up to and including the propylene/hexene-1 random copolymerization step, at which time the hydrogen was fed at a rate of 180 cc (STP)/hour, and the ethylene/hexene-1 random copolymerization step thereafter was not carried out.

The results are shown in Table B1.

EXAMPLE B3

A propylene block copolymer was produced under the conditions of Example B1 except for a propylene feed rate of 90 g/hour, a hydrogen feed rate of 1,000 cc (STP)/hour, a hexene-1 feed rate and feed time respectively of 150 g/hour and 2 hours, and an ethylene feed rate of 2.25 hours.

The results are shown in Table B1.

EXAMPLE B4

A propylene block copolymer was produced under the conditions of Example B3 except for a hydrogen feed rate of 1,300 cc (STP)/hour and an ethylene feed time of 3 hours.

The results are shown in Table B1.

COMPARISON EXAMPLE B3

Propylene block copolymerizaton was carried out under the conditions of Example B4 except that only the process part up to and including the propylene/hexene-1 random copolymerizaton was carried out, at which time the hydrogen was fed at a rate of 150 cc (STP)/hour, and the ethylene/hexene-1 random copolymerization step thereafter was not carried out.

The results are shown in Table B1.

EXAMPLE B5

Propylene block copolymerization was carried out under the conditions of Example B3 except that the process was started from the propylene/hexene-1 random copolymerization step without carrying out the propylene homopolymerization step.

The results are shown in Table B1.

EXAMPLE B6

Propylene block copolymerization was carried out under the conditions of Example B3 except for the feeding of octene-1 at a rate of 170 g/hour instead of hexene-1.

TABLE B1

|  | Ex. B1 | Comp. Ex. B1 | Ex. B2 | Comp. Ex. B2 | Ex. B3 | Ex. B4 | Comp. Ex. B3 | Ex. B5 | Ex. B6 |
|---|---|---|---|---|---|---|---|---|---|
| Propylene homopolymerization step polymerization proportion (parts by wt.) | 7.3 | 9.5 | 8.7 | 11.5 | 13.4 | 7.9 | 13.9 | 0 | 15.8 |
| Propylene/monomer A random copolymerization step |  |  |  |  |  |  |  |  |  |
| monomer A | hexene-1 | hexene-1 | hexene-1 | hexene-1 | hexene-1 | hexene-1 | hexene-1 | hexene-1 | octene-1 |
| monomer A content (% by wt.) | 7.5 | 7.8 | 10.4 | 10.2 | 15.3 | 15.3 | 15.5 | 16.2 | 9.8 |
| polymerization proportion (parts by wt.) | 80.6 | 100 | 78.1 | 100 | 65.4 | 58.7 | 100 | 59.7 | 62.8 |
| Monomer B/monomer A random copolymerization step |  |  |  |  |  |  |  |  |  |
| monomer B | ethylene |  | ethylene |  | ethylene | ethylene |  | ethylene | ethylene |
| monomer B content (% by wt.) | 95.0 |  | 93.6 |  | 90.3 | 91.2 |  | 88.6 | 95.2 |
| polymerization proportion (parts by wt.) | 19.4 |  | 21.9 |  | 34.6 | 41.3 |  | 40.3 | 37.2 |
| Polymer properties |  |  |  |  |  |  |  |  |  |
| limiting viscosity (dl/g (135° C., in decalin)) | 3.2 | 2.4 | 2.5 | 2.0 | 2.7 | 2.1 | 2.6 | 2.9 | 2.7 |
| Charpy impact strength (kg . cm/cm$^2$) at +23° C. | NB* | 13.9 | NB | 24.1 | NB | NB | NB | NB | NB |
| at −20° C. | 13.1 | 3.2 | 17.5 | 2.8 | 27.0 | NB | 3.2 | 22.0 | NB |
| at −40° C. | 8.3 | 2.3 | 11.4 | 2.5 | 16.1 | 25.3 | 3.1 | 13.2 | 22.4 |
| at −60° C. | 4.8 | 2.3 | 6.3 | 2.4 | 8.3 | 20.9 | 2.3 | 6.8 | 18.2 |
| Olsen bending stiffness (10° angle) (kg/cm$^2$) | 5070 | 4560 | 3600 | 3080 | 2520 | 2880 | 1880 | 2430 | 4100 |
| deformation under heat and pressure (130° C., 3 kg/cm$^2$, 60 min.) (%) | 2.0 | 18.4 | 3.2 | 24.2 | 6.8 | 6.2 | 32.4 | 9.5 | 5.4 |

TABLE B1-continued

|  | Comp. Ex. B1 | Comp. Ex. B1 | Ex. B2 | Comp. Ex. B2 | Ex. B3 | Ex. B4 | Comp. Ex. B3 | Ex. B5 | Ex. B6 |
|---|---|---|---|---|---|---|---|---|---|
| monomer A content in final copolymer (% by wt.) | 5.6 | 7.1 | 7.5 | 9.1 | 9.2 | 8.3 | 13.6 | 9.7 | 5.6 |
| monomer B content in final copolymer (% by wt.) | 17.2 | 0 | 18.9 | 0 | 28.9 | 34.9 | 0 | 35.7 | 32.2 |

*NB signifies that the test piece did not break, the impact strength being 30 kg . cm/cm$^2$.

EXAMPLE B7

3.2 liters of n-heptane was placed in a 10-liter stainless-steel polymerization vessel equipped with agitator vanes, and after ample purging of the vessel interior with nitrogen, 3.3 g of DEAC and 0.63 g of a titanium trichloride (TAU catalyst manufactured by Marubeni Solvay Kagaku) were introduced into the vessel. The system temperature was set at 50° C., and, as the gage pressure within the vessel was maintained at 2.0 kg/cm$^2$, propylene was fed thereinto for 15 minutes (this process constituting the propylene homopolymerization step).

The vessel interior temperature was then raised to 60° C., and propylene, hexene-1, and hydrogen were fed for 2 hours respectively at rates of 420 g/hour, 475 g/hour, and 3,120 cc (STP)/hour. Then the feeding of the hexene-1 and hydrogen was stopped, and the feeding of only the propylene was continued at the rate of 420 g/hour for a further 0.5 hour. After this feeding of the propylene was stopped, copolymerization of only the propylene and hexene-1 still remaining within the system was continued for a further 1.5 hours (the above process constituting the propylene/hexene-1 random copolymerization step).

The gases within the vessel were discharged until the gage pressure within the reactor became 0.4 kg/cm$^2$, and ethylene and propylene were fed thereinto at rates of 140 g/hour and 42 g/hour, respectively, for 2.25 hours. After this feeding was stopped, copolymerization of only the ethylene, propylene, and hexene-1 remaining within the system was continued for a further 0.5 hour (the above process constituting the ethylene/propylene/hexene-1 ternary random copolymerization step).

Upon completion of the serial copolymerization over three stages described above, the catalyst was decomposed with butanol, and the particles of the polymer thus formed were separated by filtration, repeatedly washed with n-heptane, and thereafter dried under reduced pressure and at 90° C. for 24 hours.

The proportions, compositions, and physical properties of the polymer components of the copolymer thus obtained were as indicated in Table B2.

COMPARISON EXAMPLE B4

Propylene block copolymerization was carried out under the conditions of Example B1 except that the process was carried out only up to and including the propylene/hexene-1 random copolymerization step, at which time the hydrogen was fed at a rate of 720 cc (STP)/hour, and the ethylene/propylene/hexene-1 ternary random copolymerization step thereafter was not carried out.

The results are shown in Table B2.

EXAMPLE B8

Propylene block copolymerization was carried out under the conditions of Example B7 except for feed quantities of DEAC and titanium trichloride respectively of 2.75 g and 0.55 g, a feed rate of the hexene-1 in the propylene/hexene-1 random copolymerization step of 407 g/hour, and a feeding time of ethylene and hexene-1 at the time of the ethylene/propylene/hexene-1 ternary random copolymerization of 1 hour.

The results are shown in Table B2.

COMPARISON EXAMPLE B5

Propylene block copolymerization was carried out under the conditions of Example B8 except that the process was carried out only up to and including the propylene/hexene-1 random copolymerization step, at which time the hydrogen was fed at a rate of 680 cc (STP)/hour, and the ethylene/propylene/hexene-1 ternary random copolymerization thereafter was not carried out.

The results are shown in Table B2.

EXAMPLE B9

Propylene block copolymerization was carried out under the conditions of Example B8 except for a feed rate of 367 g/hour for each of the propylene and hexene-1 and hydrogen feed rate of 1,900 cc (STP)/hour, a propylene feeding time of 3 hours, and a hexene-1 feeding time 2.5 hours in the propylene/hexene-1 random copolymerization step and except for feeding rates of the ethylene and propylene of respectively 147 g/hour and 44 g/hour in the ethylene/propylene/hexene-1 ternary random copolymerization step.

The results are shown in Table B2.

COMPARISON EXAMPLE B6

Propylene block copolymerization was carried out under the conditions of Example B9 except that the process was carried out only up to and including the propylene/hexene-1 random copolymerization step, at which time the hydrogen feed rate was 110 cc (STP)/hour, and the ethylene/propylene/hexene-1 ternary random copolymerization thereafter was not carried out.

The results are shown in Table B2.

EXAMPLE B10

Propylene block copolymerization was carried out under the conditions of Example B7 except that the hexene-1 in the propylene/hexene-1 random copolymerization step was fed at a rate of 353 g/hour, and that, in the ethylene/propylene/hexene-1 ternary copolymerization step, the procedure of first feeding the ethylene and propylene respectively at rates of 140 g/hour and 42 g/hour for the initial one hour, next stopping only the feeding of the propylene, feeding the ethylene at a rate of 280 g/hour for 2 hours, feeding the hydrogen at one time in a quantity of 3,400 cc (STP) 30 minutes after the stopping of the feeding of the propylene, and thereafter feeding the hydrogen at a rate of 6,800 cc (STP)/hour for 1.5 hours was carried out.

The results are shown in Table B2.

COMPARISON EXAMPLE B7

Propylene block copolymerization was carried out under the conditions of Example B10 except that the process was carried out only up to and including the propylene/hexene-1 random copolymerization step, at which time the hydrogen was fed at a rate of 420 cc (STP)/hour, and the ethylene/propylene/hexene-1 terpolymeric copolymerization step thereafter was not carried out.

The results are shown in Table B2.

EXAMPLE B11

Propylene block copolymerization was carried out under the conditions of Example B9 except that the propylene homoplymerization step was omitted, and the process was started from the propylene/hexene-1 random copolymerization step.

The results are shown in Table B2.

EXAMPLE B12

Propylene block copolymerization was carried out under the conditions of Example B7 except for the use of decene-1 instead of hexene-1.

The results are shown in Table B2.

(DEAC). Propylene was introduced into the reaction vessel at a temperature of 40° C. and a pressure of 2.0 kg/cm$^2$, gage, during 15 minutes, and homopolymerization of propylene was thus carried out.

The temperature was then raised to 60° C., and propylene and hexene-1 were fed into the vessel at rates of 6.5 kg/hr and 5.1 kg/hr, respectively, during a period of 2 hours, and hydrogen was also fed into the reaction system so as to maintain a hydrogen concentration in the gaseous phase in the reaction vessel interior at 13.6 percent by volume. At this point, the supply of hexene-1 was stopped, and only the propylene and hydrogen were further supplied for 0.5 hrs. Thereafter, the supply of propylene and hydrogen was also stopped and the polymerization was continued with only the still unreacted monomers existing in the reaction vessel until the pressure in the reaction vessel reached 2.0 kg/cm$^2$, gage. Random copolymerization of propylene and hexene-1 was thus effected.

The gas in the gaseous phase within the reaction vessel was then purged until the pressure in the vessel reached 0.4 kg/cm$^2$, gage, and ethylene was then fed at a rate of 2.0 kg/hr for 2.5 hours thereby to effect random copolymerization of ethylene and hexene-1. No hydrogen was introduced. Random copolymerization of ethylene and hexene-1 was thus effected.

TABLE B2

| | Ex. B7 | Comp. Ex. B4 | Ex. B8 | Comp. Ex. B5 | Ex. B9 | Comp. Ex. B6 | Ex. B10 | Comp. Ex. B7 | Ex. B11 | Ex. B12 |
|---|---|---|---|---|---|---|---|---|---|---|
| Propylene homopolymerization step polymerization proportion (parts by wt.) | 7.2 | 10.0 | 9.2 | 10.7 | 8.2 | 10.2 | 6.4 | 11.0 | 0 | 7.0 |
| Propylene/monomer A copolymerization step | | | | | | | | | | |
| monomer A | hexene-1 | hexene-1 | hexene-1 | hexene-1 | hexene-1 | hexene-1 | hexene-1 | hexene-1 | hexene-1 | decene-1 |
| monomer A content (% by wt) | 13.5 | 13.3 | 11.5 | 10.9 | 8.1 | 7.9 | 12.2 | 12.4 | 14.2 | 8.4 |
| polymerization proportion (parts by wt.) | 66.8 | 90.0 | 78.0 | 89.3 | 74.1 | 89.8 | 52.9 | 89.0 | 66.9 | 67.7 |
| Monomer B/monomer A/propylene copolymerization step | | | | | | | | | | |
| monomer B | ethylene | | ethylene | | ethylene | | ethylene | | ethylene | ethylene |
| monomer B content (% by wt) | 81.9 | | 82.4 | | 84.1 | | 95.8 | | 80.2 | 82.4 |
| monomer A content (% by wt) | 3.9 | | 3.6 | | 2.2 | | 1.8 | | 4.2 | 1.4 |
| polymerization proportion (parts by wt.) | 25.9 | | 12.8 | | 17.7 | | 40.7 | | 33.1 | 25.3 |
| Polymer properties | | | | | | | | | | |
| limiting viscosity (dl/g (135° C., in decalin)) | 2.7 | 2.1 | 2.8 | 2.2 | 3.9 | 2.9 | 4.5 | 3.2 | 2.8 | 2.7 |
| Charpy impact strength* (kg · cm/cm$^2$) at +23° C. | NB* | 28.5 | NB | 26.2 | NB | 14.4 | NB | 26.9 | NB | NB |
| at −20° C. | NB | 5.3 | 13.0 | 3.1 | NB | 3.4 | NB | 4.8 | NB | NB |
| at −40° C. | 23.0 | 3.2 | 9.5 | 2.5 | 15.9 | 2.4 | 22.6 | 3.2 | 26.3 | 18.2 |
| at −60° C. | 14.8 | 2.5 | 5.3 | 2.3 | 7.6 | 2.3 | 22.0 | 2.3 | 18.1 | 15.1 |
| Olsen bending stiffness (10° angle) (kg/cm$^2$) | 2470 | 2500 | 3410 | 2910 | 3460 | 4320 | 2890 | 2600 | 2150 | 2940 |
| deformation under heat and pressure (130° C., 3 kg/cm$^2$, 60 min.) (%) | 4.8 | 10.2 | 2.3 | 9.2 | 3.8 | 6.9 | 9.6 | 11.6 | 6.7 | 7.2 |
| monomer A content in final copolymer (% by wt.) | 10.0 | 12.0 | 9.4 | 9.7 | 6.0 | 7.1 | 7.0 | 11.0 | 10.9 | 6.0 |
| monomer B content in final copolymer (% by wt.) | 21.2 | 0 | 10.5 | 0 | 13.8 | 0 | 38.0 | 0 | 26.6 | 20.9 |

*NB signifies that the test piece did not break, the impact strength being 30 kg · cm/cm$^2$.

EXAMPLE C1

The interior of an autoclave equipped with an agitation means of 150-liter capacity was amply purged with propylene and thereafter was supplied with 35 liters (lit.) of n-heptane, 8 grams (g) of titanium trichloride (TGL catalyst manufactured by Marubeni Solvay Kagaku, Japan), and 40 g of diethylaluminum chloride The polymer slurry thus obtained was discharged into catalyst decomposition tank in which n-heptane containing n-butanol (as a catalyst decomposing agent) and potassium hydroxide (as a neutralizing agent) had been placed, and decomposition and neutralization of the catalyst was carried out. By centrifuging, a polymer was separated out as a cake containing the solvent. This cake, together with pure water containing an anionic emulsifier, was treated at 100° C., and the solvent was removed by steam stripping. Thereafter, the polymer was separated by centrifuging, dried by heating in a vacuum, and thus obtained as a product copolymer.

The results of evaluation of this copolymer are set forth in Table C1.

EXAMPLE C2

A copolymer was produced under the conditions specified in Example C1 except that the time of supplying of the ethylene during the random copolymerization of ethylene and hexene-1 was 0.5 hour and a hydrogen concentration of the gaseous phase during the random copolymerization of propylene and hexene-1 was 2.5 volume percent.

The results are shown in Table C1.

COMPARISON EXAMPLE C1

A copolymer was produced under the conditions specified in Example C1 except that the hydrogen concentration at the random copolymerization of propylene and hexene-1 was 1.8 volume percent and that polymerization was conducted up to and including the step of the random copolymerization of propylene and hexene-1 with no step of the further random copolymerization of ethylene and hexene-1.

The results obtained are set forth in Table C1.

COMPARISON EXAMPLE C2

Homopolymerization of propylene was conducted under the conditions set forth in Example C1, and after the temperature was raised to 60° C. propylene and hexene-1 were fed at rates of 6.5 kg/hr and 5.1 kg/hr, respectively, for 2 hours, during which hydrogen was fed so as to maintain the hydrogen concentration in the gaseous phase in the reaction vessel interior at 18 volume percent. The supply of propylene, hexene and hydrogen was then stopped, and the polymerization was continued with only the still unreacted monomers existing in the reaction vessel until the pressure in the reaction vessel reached 2.0 kg/cm², gage. Random copolymerization of propylene and hexene-1 was thus effected.

The gas in the gaseous phase within the reaction vessel was then purged until the pressure in the vessel reached 0.4 kg/cm², gage, and ethylene was then fed at a rate of 2.0 kg/hr for 6 hours thereby to effect random copolymerization of ethylene and hexene-1, during which hydrogen was fed so as to maintain the hydrogen concentration in the gaseous phase in the reaction vessel at 50 volume percent. Random copolymerization of ethylene and hexene-1 was thus effected.

The polymer slurry thus obtained was treated under the conditions of Example C1 thereby to obtain the final copolymer.

The results obtained are set forth in Table C1.

COMPARISON EXAMPLE C3

Homopolymerization of propylene was conducted under the conditions set forth in Example C1, and after the temperature was raised to 60° C. propylene and hexene-1 were fed at rates of 6.5 kg/hr and 9.7 kg/hr, respectively, for 2 hours, during which hydrogen was fed so as to maintain the hydrogen concentration in the gaseous phase in the reaction vessel interior at 10.5 volume percent. The supply of propylene, hexene-1 and hydrogen was then stopped, and the polymerization was continued with only the still unreacted monomers existing in the reaction vessel until the pressure in the reaction vessel reached 2.0 kg/cm². Random copolymerization of propylene and hexene-1 was thus effected.

The gas in the gaseous phase within the reaction vessel was then purged until the pressure in the vessel reached 0.4 kg/cm², gage, and ethylene was then fed at a rate of 2.0 kg/hr for 2.5 hours, thereby to effect random copolymerization of ethylene and hexene-1, during which no hydrogen was fed. Random copolymerization of ethylene and hexene-1 was thus effected.

The polymer slurry was treated with a catalyst decomposing agent and a neutralizing agent as in Example C1, and the slurry was subjected, without being centrifuged, directly to steam stripping thereby to remove the solvent. The polymer was recovered by centrifugation, and was subjected to drying under heat and vacuum thereby to give the final copolymer.

The results obtained are set forth in Table C1.

COMPARISON EXAMPLE C4

Homopolymerization of propylene was conducted under the conditions set forth in Example C1, and after the temperature was raised to 60° C., propylene was fed at a rate of 6.5 kg/hr for 2.5 hours, during which hydrogen was fed so as to maintain the hydrogen concentration in the gaseous phase in the reaction vessel interior at 3 volume percent. The supply of propylene and hydrogen was stopped, and the polymerization was continued only the still unreacted monomer existing in the reaction vessel until the pressure in the reaction vessel reached 2.0 kg/cm².

The gas in the gaseous phase within the reaction vessel was then purged until the pressure in the vessel reached 0.4 kg/cm², gage, and ethylene was then fed at a rate of 2.0 kg/hr for 1 hour and 25 minutes thereby to effect homopolymerization of ethylene.

The slurry thus obtained was treated under the same conditions of Example C1 thereby to obtain the final copolymer.

The results obtained are set forth in Table C1.

TABLE C1

| | Ex. C1 | Ex. C2 | Comp. Ex. C1 | Comp. Ex. C2 | Comp. Ex. C3 | Comp. Ex. C4 |
|---|---|---|---|---|---|---|
| Fraction A | | | | | | |
| Quantity (% by wt.) | 26.7 | 19.8 | 18.5 | 39.5 | 70.0 | 6.2 |
| DSC fusion peak temp. (°C.) | not recognizable | 99 (trace) | not recognizable | not recognizable | not recognizable | not recognizable |
| Monomer A content (% by wt.) | 27.5 | 32.1 | 34.9 | 17.5 | 60.5 | 0 |
| Monomer B content (% by wt.) | 22.3 | 11.5 | 0 | 49.2 | 20.8 | 38.9 |
| Fraction B | | | | | | |
| Quantity (% by wt.) | 31.2 | 32.1 | 29.4 | 31.2 | 24.9 | 5.1 |
| DSC fusion peak temp.* (°C.) | 122.0 | 126.5 | 115.8 | 123.0 | 118.8 | 115.2 |

TABLE C1-continued

|  | Ex. C1 | Ex. C2 | Comp. Ex. C1 | Comp. Ex. C2 | Comp. Ex. C3 | Comp. Ex. C4 |
| --- | --- | --- | --- | --- | --- | --- |
|  | 103.5 | 104.5 |  | 104.2 | 103.5 |  |
| Monomer A content (% by wt.) | 9.4 | 11.6 | 12.5 | 10.8 | 9.1 | 0 |
| Monomer B content (% by wt.) | 32.1 | 7.3 | 0 | 65.4 | 31.8 | 29.7 |
| Fraction C |  |  |  |  |  |  |
| Quantity (% by wt.) | 42.1 | 48.1 | 52.1 | 29.3 | 5.1 | 88.7 |
| DSC fusion peak temp.* (°C.) | 146.2 | 157.6 | 145.2 | 148.3 | 144.8 | 162.1 |
|  | 119.1 | 121.9 |  | 119.9 |  | 123.1 |
| Monomer A content (% by wt.) | 2.4 | 4.2 | 5.3 | 3.1 | 3.3 | 0 |
| Monomer B content (% by wt.) | 17.5 | 2.7 | 0 | 41.8 | 17.8 | 9.1 |
| Final polymer |  |  |  |  |  |  |
| Limiting viscosity (dl/g) | 3.4 | 3.1 | 2.7 | 4.2 | 3.1 | 4.5 |
| Monomer A content (% by wt.) | 11.3 | 12.1 | 12.9 | 11.2 | 44.8 | 0 |
| Monomer B content (% by wt.) | 23.3 | 3.6 | 0 | 52.1 | 23.4 | 12.0 |
| Olsen bending stiffness (kg/cm$^2$) | 3800 | 2900 | 2870 | 1920 | <500 | 9500 |
| Deformation under heat and pressure (%) | 10.5 | 14.5 | 21.0 | 71.2 | 100 | 1.2 |
| Charpy impact strength (kg/cm$^2$) |  |  |  |  |  |  |
| at +23° C. | NB | NB | 24.3 | NB | NB | 23.2 |
| at −20° C. | 9.2 | 5.2 | 3.1 | NB | 12.2 | 6.5 |
| at −40° C. | 6.5 | 1.8 | 2.0 | 24.8 | 7.9 | 2.1 |
| at −60° C. | 3.8 | 1.1 | 1.8 | 11.5 | 5.0 | 1.2 |

*The two values indicate that there were two fusion peaks.

What is claimed is:

1. A thermoplastic propylene block copolymer, characterized in that:
   (1) the limiting viscosity of said copolymer in decalin at 135° C. is 0.3 to 15 dl/gram;
   (2) said copolymer comprises 2 to 40 percent by weight of hexene-1 and 1 to 50 percent by weight of ethylene, the remainder being substantially propylene, in blocks consisting essentially of (a) a random copolymer block of propylene and hexene-1 and (b) an ethylene polymer block selected from the group consisting of ethylene homopolymer blocks, binary random copolymer blocks of ethylene and hexene-1 and ternary random copolymer blocks of ethylene, propylene and hexene-1; and
   (3) the quantity, the fusion peak temperature as determined by differential scanning calorimetry (DSC), and the contents of hexene-1 and ethylene of each of the fractions resulting from successive extraction of the copolymer at 40° C. and 80° C. by means of o-dichlorobenzene are as indicated in the table:

| Fraction | Quantity (% by weight) | Fusion peak temp. by DSC (°C.) | Content of [straight-chain α-olefin] hexene-1 (% by weight) | Content of ethylene (% by weight) |
| --- | --- | --- | --- | --- |
| Fraction soluble at 40° C. or lower | 5 to 40 | Substantially no peaks recognizable | 5 to 80 | 4 to 50 |
| Fraction soluble above 40° C. up to 80° C. | 15 to 45 | 80 to 150 | 3 to 60 | 3 to 45 |
| Fraction insoluble at 80° C. or lower | 15 to 80 | at the higher temp. 135 to 165 at the lower temp. 105 to 135 | 0.1 to 11 | 1 to 35 |

2. A thermoplastic propylene block copolymer characterized in that:
   (1) the limiting viscosity of said copolymer in decalin at 135° C. is 0.3 to 15 dl/g; and
   (2) said copolymer consists essentially of (a) 50 to 99 parts by weight of a random copolymer block of propylene and hexene-1 and (b) 1 to 50 parts by weight of an ethylene polymer block selected from the group consisting of ethylene homopolymer blocks, binary random copolymer blocks of ethylene and hexene-1, and ternary random copolymer blocks of ethylene, propylene, and hexene-1.

3. A copolymer according to claim 1 which is comprised of about 3 to 30 percent by weight of hexene-1, about 2 to 40 percent by weight of ethylene and the remainder is substantially propylene.

4. A copolymer according to claim 1 which is comprised of about 4 to 20 percent by weight of hexene-1, about 4 to 30 percent by weight of ethylene and the remainder is substantially propylene.

5. A propylene block copolymer according to claim 1 or 2 in which said ethylene polymer block (b) is said ethylene homopolymer blocks.

6. A propylene block copolymer according to claim 1 or 2 in which said ethylene polymer block (b) is said binary random copolymer blocks of ethylene and hexene-1.

7. A propylene block copolymer according to claim 1 or 2 in which said ethylene block (b) is said ternary random copolymer blocks of ethylene, propylene and hexene-1.

8. A propylene block copolymer according to claim 2 in which said random copolymer block of propylene and hexene-1 is present in an amount of about 60 to 98 parts by weight and said ethylene polymer block is present in an amount of about 2 to 40 parts by weight.

9. A propylene block copolymer according to claim 2 in which said random copolymer block of propylene and hexene-1 is present in an amount of about 70 to 95 parts by weight and said ethylene polymer block is present in an amount of about 5 to 30 parts by weight.

10. A copolymer according to claim 1 or 2 in which the random copolymer block of propylene and hexene-1 contains about 1 to 20 percent of hexene-1.

11. A copolymer according to claim 1 or 2 in which the random copolymer block of propylene and hexene-1 contains about 3 to 18 percent of hexene-1.

12. A copolymer according to claim 1 or 2 in which the random copolymer block of propylene and hexene-1 contains about 5 to 15 percent of hexene-1.

* * * * *